United States Patent
Rowley et al.

(10) Patent No.: US 6,854,543 B2
(45) Date of Patent: Feb. 15, 2005

(54) SEMICIRCULAR BATTERY FOR A VEHICLE

(75) Inventors: Thomas Rowley, Linden, MI (US); Geoffrey Bossio, Clawson, MI (US); Michelle Fecteau, East China, MI (US); Jon Rasbach, Davisburg, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 9 days.

(21) Appl. No.: 10/293,717

(22) Filed: Nov. 12, 2002

(65) Prior Publication Data
US 2004/0089487 A1 May 13, 2004

(51) Int. Cl.[7] .......................... B60R 16/04; H01M 2/00; H01M 2/02; B65D 85/00
(52) U.S. Cl. ...................... 180/68.5; 429/163; 429/164; 206/703; D13/104
(58) Field of Search .................... 180/68.5; 429/163, 429/164, 165, 166, 167, 168, 169, 170, 175, 176, 178, 179, 149; 206/703; D13/103, 104, 105, 106

(56) References Cited

U.S. PATENT DOCUMENTS

| | | | | |
|---|---|---|---|---|
| 3,942,027 A | * | 3/1976 | Fima | 307/10.1 |
| 4,265,984 A | * | 5/1981 | Kaye | 429/178 |
| 4,424,264 A | * | 1/1984 | McGuire et al. | 429/179 |
| 4,498,614 A | * | 2/1985 | Guarr | 224/42.13 |
| 4,952,468 A | * | 8/1990 | Abraham et al. | 429/175 |
| 5,212,026 A | * | 5/1993 | Mitchell | 429/160 |
| 5,447,110 A | * | 9/1995 | Brown | 141/2 |
| 6,238,813 B1 | * | 5/2001 | Maile et al. | 429/9 |
| 6,276,477 B1 | * | 8/2001 | Ida | 180/89.1 |
| 6,528,203 B1 | * | 3/2003 | Mitamura | 429/98 |
| 6,622,809 B2 | * | 9/2003 | Takahashi | 180/68.5 |
| 6,641,949 B2 | * | 11/2003 | Cheiky et al. | 429/53 |
| 6,674,624 B2 | * | 1/2004 | Matsuura | 361/115 |
| 2003/0228516 A1 | * | 12/2003 | McDermott | 429/160 |

FOREIGN PATENT DOCUMENTS

JP    408218214 A  *  8/1996

OTHER PUBLICATIONS

U.S. Appl. No. 60/386,167.*

* cited by examiner

Primary Examiner—Christopher P. Ellis
Assistant Examiner—Gerald B. Klebe
(74) Attorney, Agent, or Firm—Edwin W. Bacon, Jr.

(57) ABSTRACT

A semicircular vehicle battery having a battery housing defined by a curved wall surface enclosed by a top surface and a bottom surface. The curved wall surface further defines an open center area and opposing ends. A first terminal and a second terminal are attached to the battery housing, the first and second terminals providing points of electrical connection to the battery. The battery is arranged to be mounted to a vehicle within a spare tire cavity.

5 Claims, 2 Drawing Sheets

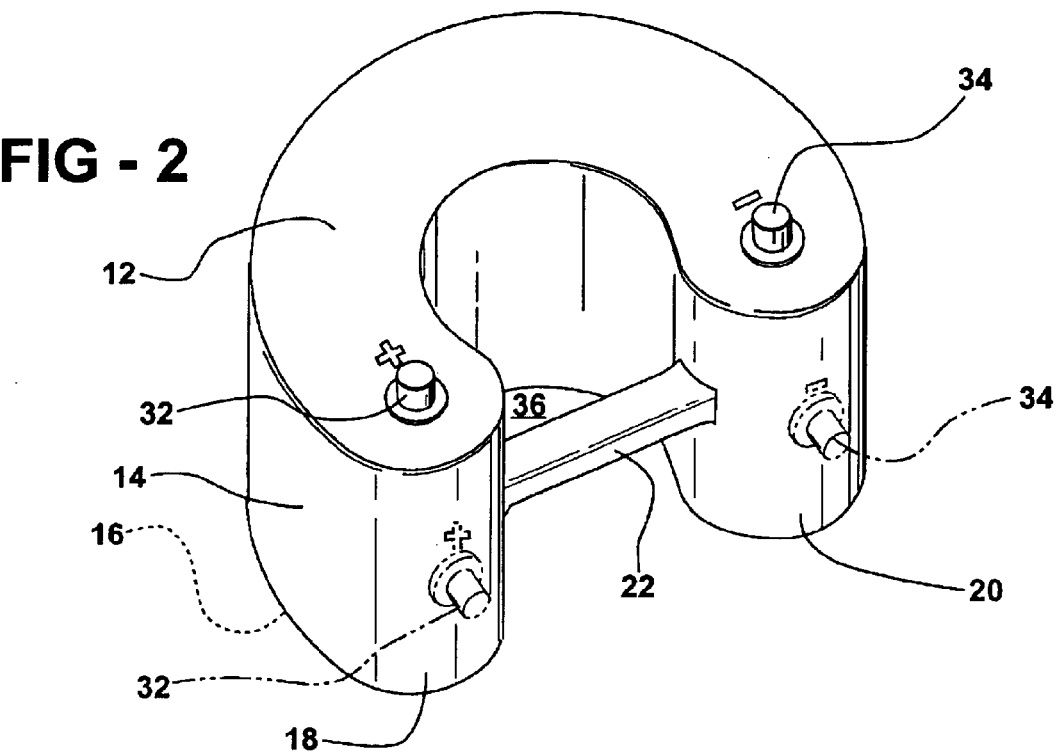
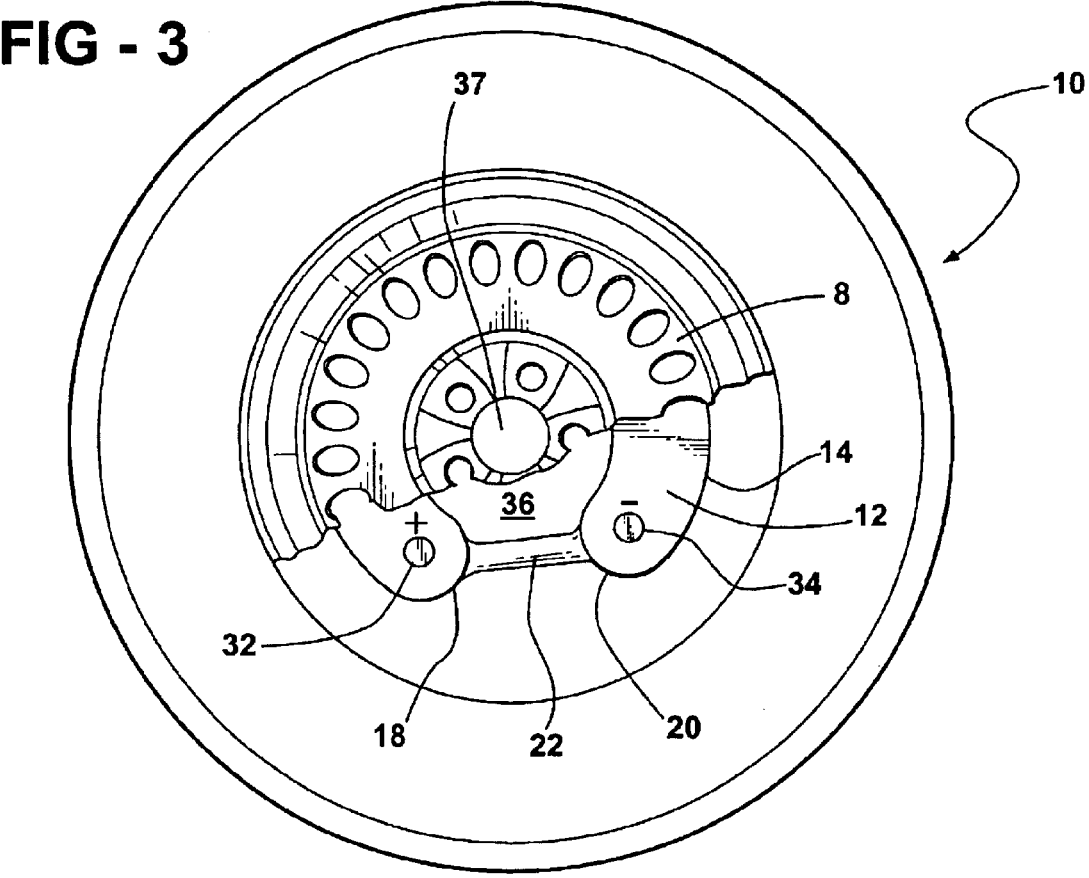

SEMICIRCULAR BATTERY FOR A VEHICLE

FIELD OF INVENTION

This invention relates to vehicle battery arrangements, and more specifically to a battery adapted for installation within the spare tire compartment of a vehicle.

BACKGROUND

Automotive vehicles typically utilize a lead-acid battery to start the vehicle and to operate accessory loads when the engine is not running. These batteries are generally of a square or rectangular shape and are usually located in the engine compartment in the proximity of the starter and alternator, which are attached to the engine.

Over the course of normal operation, dirt and water reaching the engine compartment can collect on the battery case and can provide a conductive medium for electrical current to leak between the terminals, thereby draining electrical charge from the battery. For this reason, it is recommended to routinely inspect and clean the battery terminals. However, due to the limited packaging space in the engine compartment, it can often be difficult to access the terminals in order to provide the desired maintenance or to remove and replace the battery.

In addition to the limited packaging space in the engine compartment, high temperature and vibration from the engine can degrade the performance of the battery and shorten battery life. This results in a greater need for regular inspection, maintenance and replacement.

Locating the battery in the engine compartment also creates a challenge when designing the vehicle for crashworthiness. A battery is generally a rigid structure that maintains its shape during a crash. This physical property creates a challenge for vehicle designers in that the battery consumes space that may otherwise be used to provide a crush zone in the vehicle structure.

BRIEF SUMMARY OF THE INVENTION

Accordingly, one aspect of the present invention is to provide a battery that may be mounted in a vehicle such that the battery is readily accessible for maintenance or replacement.

Another aspect of the present invention is to provide a battery that may be mounted in a vehicle such that the battery is located away from the engine compartment with its associated high temperature, vibration, dirt and water.

Yet another aspect of the invention is to provide a battery that may be mounted in the unused space inside of a spare wheel compartment. Packaging space is thereby preserved for other components such as a fuel tank, mufflers, catalytic converters, and so forth.

One more aspect of the invention is to provide a battery that may be mounted within the unused rigid void of a spare wheel. Locating the battery inside the spare wheel makes crush space available in the region where the battery would traditionally be located in the vehicle. By locating the battery within the rigid spare wheel, crush space is made available without sacrificing crush space in another portion of the vehicle.

In accordance with the forgoing aspects of the invention, a semicircular vehicle battery is provided, where the battery has a housing defined by a curved wall surface enclosed by a top surface and a bottom surface. The curved wall surface further defines an open center area and opposing ends. A first terminal and a second terminal are attached to the battery housing and provide points of electrical connection to the battery.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF DRAWINGS

The present invention will become more fully understood from the detailed description and the accompanying drawings, wherein:

FIG. 2 is an elevated perspective view of an exemplary embodiment of a semi-circular shaped battery; and FIG. 3 is a top view of a spare tire assembly broken away to show positioning of the battery.

DETAILED DESCRIPTION OF EXEMPLARY EMBODIMENTS

Figure 1:
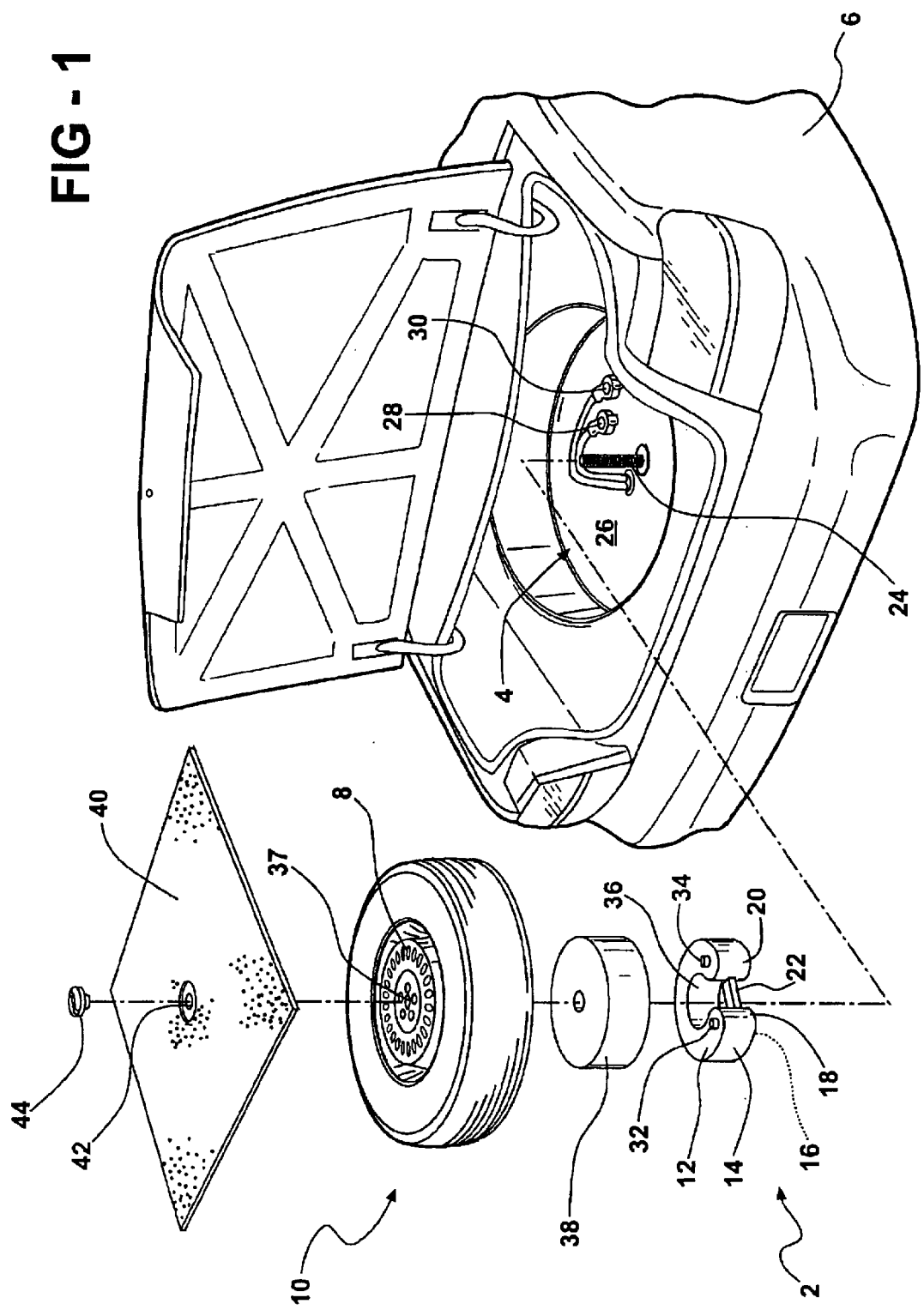
FIG. 1 is an exploded view of an exemplary embodiment of a semi-circular shaped battery, battery connector, spare tire assembly, and spare tire storage area.

The detailed description, while indicating preferred embodiments of the invention and specific examples, is intended for purposes of illustration only. Variations and modifications within the scope and spirit of the invention will become apparent to those skilled in the art from the following detailed description.

Referring to FIG. 1, a vehicle battery 2 according to the present invention is arranged for mounting in a tire storage area 4 of a vehicle 6. The battery 2 is formed in a semicircular shape and dimensioned to fit within the wheel 8 of a spare tire and wheel assembly 10. The battery 2 includes a housing having a top surface 12, a continuous curved wall surface 14, and a bottom surface 16. The continuous curved wall surface 14 outlines a semicircular enclosure and provides a gap between opposing ends 18 and 20. A carrying handle 22 may be attached or molded into the housing to extend across the gap between the opposing ends 18, 20. The handle 22 should be positioned in the gap such that it does not interfere with the wheel 8.

In an exemplary configuration, the vehicle 6 includes a spare tire mounting bolt 24 affixed within the spare tire storage area 4 and extending vertically from a floor 26 of the spare tire storage area 4. The vehicle also includes battery connectors 28 and 30, which extend into the spare tire storage area 4 for connection to a pair of terminals 32 and 34. The battery center area 36 is open and allows the battery 2 to fit around the spare tire mounting bolt 24. A pair of electrical terminals 32 and 34 are located on the battery 2 for connection with the pair of terminals 28, 30. As shown in FIG. 2, two or more pairs of electrical terminals 32, 34 may be located on the battery 2 to facilitate using the battery 2 in vehicles having various battery connector 28, 30 configurations.

Returning to FIG. 1, the spare tire and wheel assembly 10 is aligned to fit over the semi-circular shaped battery 2 and battery connectors 28, 30. The spare tire mounting bolt 24 extends through the wheel center 37. A spare tire cover 40 is aligned to fit over the spare tire and wheel assembly 10 and the spare tire mounting bolt 24 extends through the center 42 of the spare tire cover 40. A threaded cap 44 is affixed to the spare tire bolt 24 to maintain spare tire cover 40 in place. The spare tire cover 40 and threaded cap 44 encloses the battery 2, connectors 28, 30, and spare tire assembly 10 within the spare tire storage compartment 4. The battery 2 and terminals 32, 34 are thereby protected from dirt and water that would otherwise reach the battery 2 if it were placed in an exposed engine compartment. An insulating cover 38 may be used to prevent contact between the terminals 32, 34 and the wheel 8, which may cause the battery 2 to electrically discharge.

FIG. 3 shows the positional relationship between the battery 2 and the spare tire and wheel assembly 10. The view of wheel 8 is cut away to provide a better view of its position with respect to the battery 2.

To facilitate mounting, the battery 2 may be removably fixed to the floor 26 with the use of battery clamps. Battery clamps, such as those which urge against the battery top surface 12, or against protrusions from the perimeter of the battery bottom surface 16, thereby biasing the battery 2 against the floor 26, are well known in the art and therefore not shown.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle and battery in combination, said combination comprising:

a spare wheel storage area;

a spare wheel assembly removably mounted to said spare wheel storage area such that a generally circular void is defined between at least a portion of said spare wheel storage area and said spare wheel assembly;

first and second battery connectors extending from said spare wheel storage area into the circular void;

a semicircular battery housing defined by a continuous curved wall surface enclosed by a top surface and a bottom surface, said continuous curved wall surface further defining an open center area and opposing ends; and a first terminal and a second terminal attached to said battery housing, said first terminal being connected to said first battery connector and said second terminal being connected to said second battery connector, wherein said battery housing is positioned within the void so that said first and second battery connectors, and said first and second terminals are contained within the circular void.

2. The vehicle battery of claim 1 further comprising a third terminal and a fourth terminal, said third and fourth terminals being attached to said battery housing and providing alternate points of electrical connection to the battery.

3. The vehicle battery of claim 1 further comprising a handle integral to said housing and spanning said opposing ends.

4. The combination of claim 1 further comprising an insulating cover located between said spare wheel assembly and said terminals.

5. The combination of claim 2 further comprising an insulating cover located between said spare wheel assembly and said terminals.

* * * * *